(12) United States Patent
Perry et al.

(10) Patent No.: US 7,809,873 B2
(45) Date of Patent: Oct. 5, 2010

(54) DIRECT DATA TRANSFER BETWEEN SLAVE DEVICES

(75) Inventors: Nir Perry, Holon (IL); Yaron Pikman, Ramat-Gan (IL)

(73) Assignee: SanDisk IL Ltd., Kfar Saba (IL)

( * ) Notice: Subject to any disclaimer, the term of this patent is extended or adjusted under 35 U.S.C. 154(b) by 90 days.

(21) Appl. No.: 12/101,821

(22) Filed: Apr. 11, 2008

(65) Prior Publication Data

US 2009/0259785 A1    Oct. 15, 2009

(51) Int. Cl.
*G06F 13/00* (2006.01)
(52) U.S. Cl. ........................ 710/110; 711/162
(58) Field of Classification Search ................ 710/110, 710/305; 711/112, 162
See application file for complete search history.

(56) References Cited

U.S. PATENT DOCUMENTS

| | | | | |
|---|---|---|---|---|
| 4,740,916 A * | 4/1988 | Martin | ....................... | 711/115 |
| 5,564,026 A | 10/1996 | Amini et al. | | |
| 5,867,733 A | 2/1999 | Meyer | | |
| 6,408,369 B1 * | 6/2002 | Garrett et al. | ................ | 711/165 |
| 6,425,032 B1 | 7/2002 | Prasanna | | |
| 6,640,269 B1 * | 10/2003 | Stewart | ........................ | 710/52 |
| 6,775,830 B1 * | 8/2004 | Matsunami et al. | .......... | 717/176 |
| 6,993,618 B2 * | 1/2006 | Chen et al. | ................... | 710/305 |
| 7,447,853 B2 * | 11/2008 | Seong | ......................... | 711/162 |
| 2004/0148450 A1 * | 7/2004 | Chen et al. | ................... | 710/313 |
| 2005/0086413 A1 * | 4/2005 | Lee et al. | ..................... | 710/313 |
| 2006/0031593 A1 | 2/2006 | Sinclair | | |
| 2006/0069888 A1 * | 3/2006 | Martinez | ..................... | 711/162 |

FOREIGN PATENT DOCUMENTS

| | | |
|---|---|---|
| CN | 101 132 328 A | 2/2008 |
| WO | WO 99/49397 A | 9/1999 |
| WO | WO 2009/021974 A | 2/2009 |

OTHER PUBLICATIONS

Barnett, "Revolution in the Storage Network," Serial Storage Wire Archive, downloaded Apr. 10, 2008, http://serialstoragewire.org/Articles/2007_03/feature22.html, 5 pages.

(Continued)

*Primary Examiner*—Paul R Myers
(74) *Attorney, Agent, or Firm*—Beyer Law Group LLP

(57) ABSTRACT

In one aspect, a method of transferring data over a plurality of communication lines is described. A first command is sent from a master device coupled with the communication lines to a first destination slave device coupled with the communication lines instructing the first destination slave device to listen to and write data from the communication lines starting at a first time. A second command is sent from the master device to a second source slave device coupled with the communication lines instructing the second source slave device to read and output first data onto the communication lines starting at or after the first time. In this way, the first data output from the second source slave device beginning at the first time is stored by the first destination slave device beginning at the first time without requiring first transferring the data to the master device or any other device.

34 Claims, 4 Drawing Sheets

300

OTHER PUBLICATIONS

Barnett "SAS as a budding fabric," Embedded Computing Design, downloaded Apr. 10, 2008, http://www.embedded-computing.com/articles/id/?2258, 6 pages.

International Search Report dated Jul. 17, 2009 from International Application No. PCT/IB2009/005138.

Written Opinion dated Jul. 17, 2009 from International Application No. PCT/IB2009/005138.

Intersil, "82C37A CMOS High Performance Programmable DMA Controller," Intersil Datasheet, Mar. 1997, pp. 192-215. XP-002363173.

PCI Special Interest Group, "PCI Local Bus Specification," PCI Local Bus Specification Production Version, Revision 2.1, Jun. 1, 1995, 298 pages. XP-002251932.

Universal Serial Bus, "On-The-Go Supplement to the USB 2.0 Specification," Revision 1.0, Dec. 18, 2001, 74 pages. XP-002952944.

SD Group, "Simplified Version of: Part 1 Physical Layer Specification," SD Memory Card Specifications, Version 1.01, Apr. 15, 2001, 32 pages. XP-002291858.

* cited by examiner

DIRECT DATA TRANSFER BETWEEN SLAVE DEVICES

FIELD OF THE INVENTION

The present invention relates generally to transferring data over communication lines between passive slave devices. More particularly, the invention relates to host device initiated data transferring between passive slave devices without first transferring the data to the host device or any other intermediary storage device.

BACKGROUND

It has become commonplace to connect a host processor to different devices using a plurality of conducting wires referred to as a "bus" that typically complies with well known standards. The devices connected to the bus may include memory/storage devices, communications devices, sensing devices, etc. and these devices may be either fixed or removable. In most situations, some or all of the wires that define the bus are shared amongst any and/or all of the devices that are connected to the bus. Since the devices coupled to the bus share the same conducting wires, each device is typically assigned a unique ID or address on the bus and is configured to respond only to messages that are addressed to that unique ID/address. In this way, multiple devices can share the same conducting wires that form the bus resulting in a substantially reduced bus size than would otherwise be required.

Typically, a master/slave bus protocol is adopted for the bus. Master/slave is a model for a communication protocol in which one device or process has unidirectional control over one or more other devices. In a conventional system, once a master/slave relationship between devices or processes is established, the direction of control is always from the master to the slaves, i.e. a slave cannot initiate a transaction. In some systems a master is elected from a group of eligible devices with the other devices acting in the role of slaves. In conventional systems, data is not transferred directly between slave devices; rather, data is typically passed over the common bus from a source slave storage device to a host controller or other intermediary where the data is temporarily cached before being re-output by the host controller over the common bus and targeted towards a destination slave storage device where the data is then read from the bus and stored.

While conventional systems work well, it is desirable to reduce the host CPU resources required for transferring data between devices as well as to reduce the bus utilization and memory requirements of the host and/or other temporary storage devices.

SUMMARY OF THE DESCRIBED EMBODIMENTS

In one aspect, a method of directly transferring data between a first and a second device coupled with each other and with a master device with one or more communication lines is described. According to various embodiments, the master device instructs the first device to listen to the one or more communication lines. The second device transmits data onto the one or more communication lines. In this way, the data transmitted onto the one or more communication lines by the second device is received by the first device without further intervention by the master device.

In a similar aspect, a method of transferring data over a plurality of communication lines is described. According to various embodiments, a first command is sent from a master device coupled with the communication lines to a first destination slave device coupled with the communication lines. The first command instructs the first destination slave device to listen to and write data from the communication lines starting at a first time. A second command is also sent from the master device to a second source slave device coupled with the communication lines. The second command instructs the second source slave device to read and output first data onto the communication lines starting at or after the first time. In this way, the first data output from the second source slave device beginning at the first time is stored by the first destination slave device beginning at the first time without requiring first transferring the first data to the master device or any other temporary storage device.

In another aspect, a method of communicating over a plurality of communication lines is described. According to various embodiments, a first command is sent from a master device coupled with the communication lines to a first slave device coupled with the communication lines. The first command instructs the first destination slave device to listen to the communication lines starting at a first time. A second command is also sent from the master device to a second slave device coupled with the communication lines. The second command instructs the second slave device to output a third communication onto the communication lines starting at or after the first time. In this way, the third communication output from the second slave device beginning at the first time is read by the first slave device beginning at the first time without requiring first transferring the third communication to the master device or any other device.

In yet other aspects, systems are described for implementing each of the aforementioned methods. In one embodiment, a system is described that includes a first addressable destination slave device configured to store data, a second addressable source slave device configured to store data and including first data stored therein, and a master device arranged to manage the first and second slave devices. The system further includes a plurality of communication lines that couple the master device and at least each of the first and second slave devices. According to an embodiment, the master device is further arranged to send a first command to the first slave device instructing the first slave device to listen to and write data from the communication lines beginning at a first time and a second command to the second slave device instructing the second slave device to read and output the first data onto the communication lines beginning at or after the first time, such that the first data is transferred from the second source slave device to the first destination slave device without requiring first transferring the first data to the master device or any other storage device.

In another embodiment, the system includes a first addressable slave device, a second addressable slave device, a master device arranged to manage the first and second slave devices, and a plurality of communication lines that couple the master device and at least each of the first and second slave devices. In an embodiment, the master device is further arranged to send a first command to the first slave device instructing the first slave device to listen to the communication lines beginning at a first time and a second command to the second slave device instructing the second slave device to output a third communication onto the communication lines beginning at or after the first time, wherein the third communication output from the second slave device beginning at the first time is read by the first slave device beginning at the first time without requiring first transferring the third communication to the master device or any other device.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE DESCRIBED EMBODIMENTS

Figure 1:
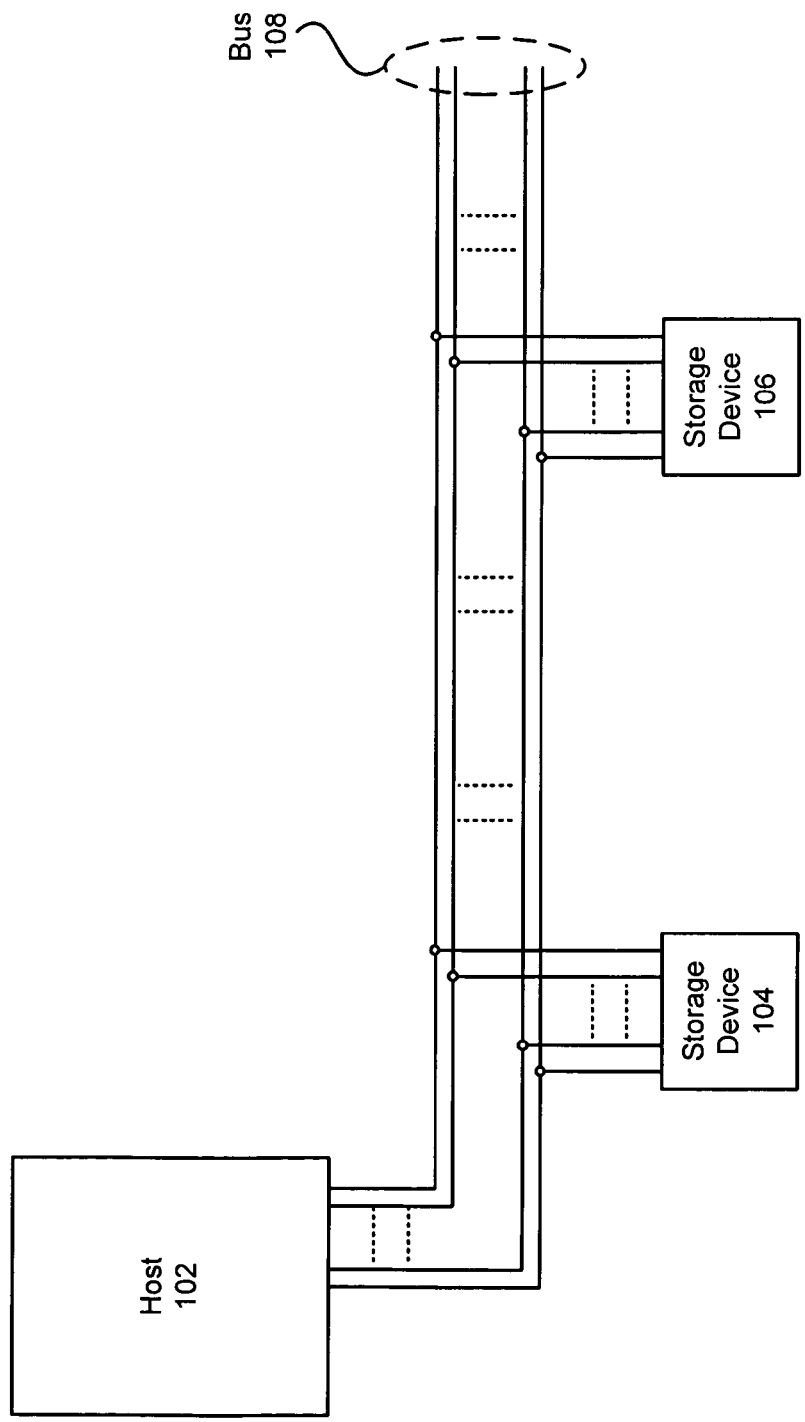
FIG. 1 illustrates a simplified block diagram of a system in accordance with an embodiment of the present invention.

Reference will now be made in detail to particular embodiments of the invention, examples of which are illustrated in the accompanying drawings. While the invention will be described in conjunction with the following particular embodiments, it will be understood that they are not intended to limit the invention to the described embodiments. To the contrary, the described embodiments are intended to cover alternatives, modifications, and equivalents as may be included within the spirit and scope of the invention as defined by the appended claims.

Aspects of the present invention describe methods, devices and systems for transferring data over communication lines that couple two or more slave devices with a master device, and in particular embodiments, two or more storage devices with a host device. Particular embodiments of the invention are discussed below with reference to FIGS. 1 through 4. The following description focuses on embodiments in which the storage devices are interconnected via a memory/storage related bus to a host device serving as a master device and in which data is transferred directly from one storage device to another without first transferring the data to the host device or any other intermediate device, and in which the slave storage devices are incapable of initiating the transfer between themselves. However, those skilled in the art will readily appreciate that the detailed description given herein with respect to these figures is for explanatory purposes as the invention extends beyond these limited embodiments. By way of example, in an alternate embodiment, the storage devices are not interconnected with a conventional bus architecture; rather, each device is connected only with its neighboring devices.

Although it is contemplated that any suitable storage devices may be used, in the following description of particular embodiments, the storage devices are presumed to be non-volatile storage devices. However, the invention may also be implemented on volatile storage devices. By way of example, the non-volatile storage devices may be FLASH or EEPROM based storage devices. The storage devices may also be either removable or non-removable (fixed) devices. As is well known, non-removable devices are not intended for subsequent removal from the bus once they have been connected with the bus whereas removable devices are configured so as to be readily removed or added to the bus.

One type of removable device that is well suited for use as a storage device according to the present invention is a memory card. Memory cards are commonly used to store digital data for use with various electronics products. The memory card is often removable from the host system so the stored digital data is portable. The memory cards can have a relatively small form factor and be used to store digital data for various electronics products and systems including personal computers, notebook computers, hand-held computing devices, cameras, cellular telephones, media players/recorders (e.g., MP3 devices), personal digital assistants (PDAs), network cards, network appliances, set-top boxes, and other hand-held or embedded devices.

The storage devices described herein may be compatible with any memory card format or protocol, such as the secured digital (SD) protocol used for managing digital media such as audio, video, or picture files. The storage device may also be compatible with a multi media card (MMC) memory card format, a compact flash (CF) memory card format, a flash PC (e.g., ATA Flash) memory card format, a smart-media memory card format, or with any other industry standard specifications. One supplier of these memory cards is SanDisk Corporation of Milpitas, Calif. The storage device may also apply to other erasable programmable memory technologies, including but not-limited to electrically-erasable and programmable read-only memories (EEPROMs), EPROM, MRAM, FRAM ferroelectric and magnetic memories. Note that the storage device configuration does not depend on the type of removable memory, and may be implemented with any type of memory, whether it being a flash memory or another type of memory. The storage device may also be implemented with a one-time programmable (OTP) memory chip and/or with a 3 dimensional memory chip technology.

FIG. 1 illustrates a simplified block diagram of a master/slave system 100 in accordance with an embodiment of the present invention. By way of example, according to particular embodiments described herein, a slave device may take the form of a local storage device such as but not limited to any of the aforementioned storage devices described above while the master device takes the form of a host device such as but not limited to any of the aforementioned host devices described above. As described above in the background, master/slave is a model for a communication protocol in which one device or process has unidirectional control over one or more other devices. In a conventional system, once a master/slave relationship between devices or processes is established, the direction of control is always from the master to the slaves, i.e. a slave cannot initiate a transaction. In some systems, a master is elected from a group of eligible devices with the other devices acting in the role of slaves. Accordingly, master/slave system 100 (hereinafter also referred to simply as system 100) includes at least master device 102 (hereinafter also referred to as host device 102 or host controller 102), first slave device 104 (hereinafter also referred to as storage device 104) and second slave device 106 (hereinafter also referred to as storage device 106) that relate to each other at least by way of a conventional master/slave paradigm.

System 100 also includes a number of communication or signal lines 108 (hereinafter referred to as bus 108) used to connect host device 102 with peripheral storage devices 104 and 106. It should be noted that even though only two peripheral storage devices are shown, more or fewer storage devices can readily be coupled to bus 108. The actual number of signal lines that constitute bus 108 may also be widely varied. By way of example, some modern buses have a relatively small number of signal lines (e.g. 8-16 signal lines), while other modern buses may have over 100 lines that may themselves be logically divided into subsets of lines that effectively act as sub-buses (e.g., an address bus, a control bus, a data bus, etc.).

Each storage device typically includes a corresponding unique and permanent device identifier. In some bus protocols, the permanent device identifier is used to identify the device in bus communications. In other protocols, the host controller will assign a temporary device identifier and/or an associated set of addresses to each of the devices coupled to the bus. Typically, such temporary device identifiers and/or addresses are assigned upon connection and initialization of the respective storage device 104 or 106 with the bus 108 and host controller 102, or in the case of a removable memory card, upon insertion of the card into an associated card reader. Although the specifics of the bus protocol and the memory management protocol will vary based on the nature of the particular bus and storage devices employed, the host controller 102 is typically aware of each storage device's respective device identifier(s).

Typically, a specific device attached to the bus 108 will know whether it is supposed to respond to a particular communication or command based upon the communication sent from the host 102, which typically uses device identifiers and/or addresses in targeting communications/commands to specific storage devices. That is, in some protocols, each communication will generally include a device identifier that informs the storage devices whether or not they are the target of the communication. In other protocols, the device identifier is not explicitly sent as part of each memory related communication. Rather, the command may identify an address to which the command (e.g., a read, write or erase command) is addressed. In general, devices that are not identified or addressed by the communication will simply ignore the communication.

In the illustrated embodiment, communications are sent over the shared bus 108 to the storage devices 104 and 106 according to a suitable bus protocol. The bus protocol specifies how information is communicated over the bus. Again, suitable bus protocols include the Secure Digital Card (SD) protocol, the Multi Media Card (MMC) protocol and the Universal Serial Bus (USB) protocol, although a wide variety of other bus protocols may be used as well. Furthermore, as will be appreciated by those familiar with the art, current storage devices employ a wide variety of different architectures and it is expected that new architectures will continue to be developed. In general, the present invention may be employed in conjunction with a wide variety of different types of memory, so long as the storage device has suitable processing power.

Figure 2:
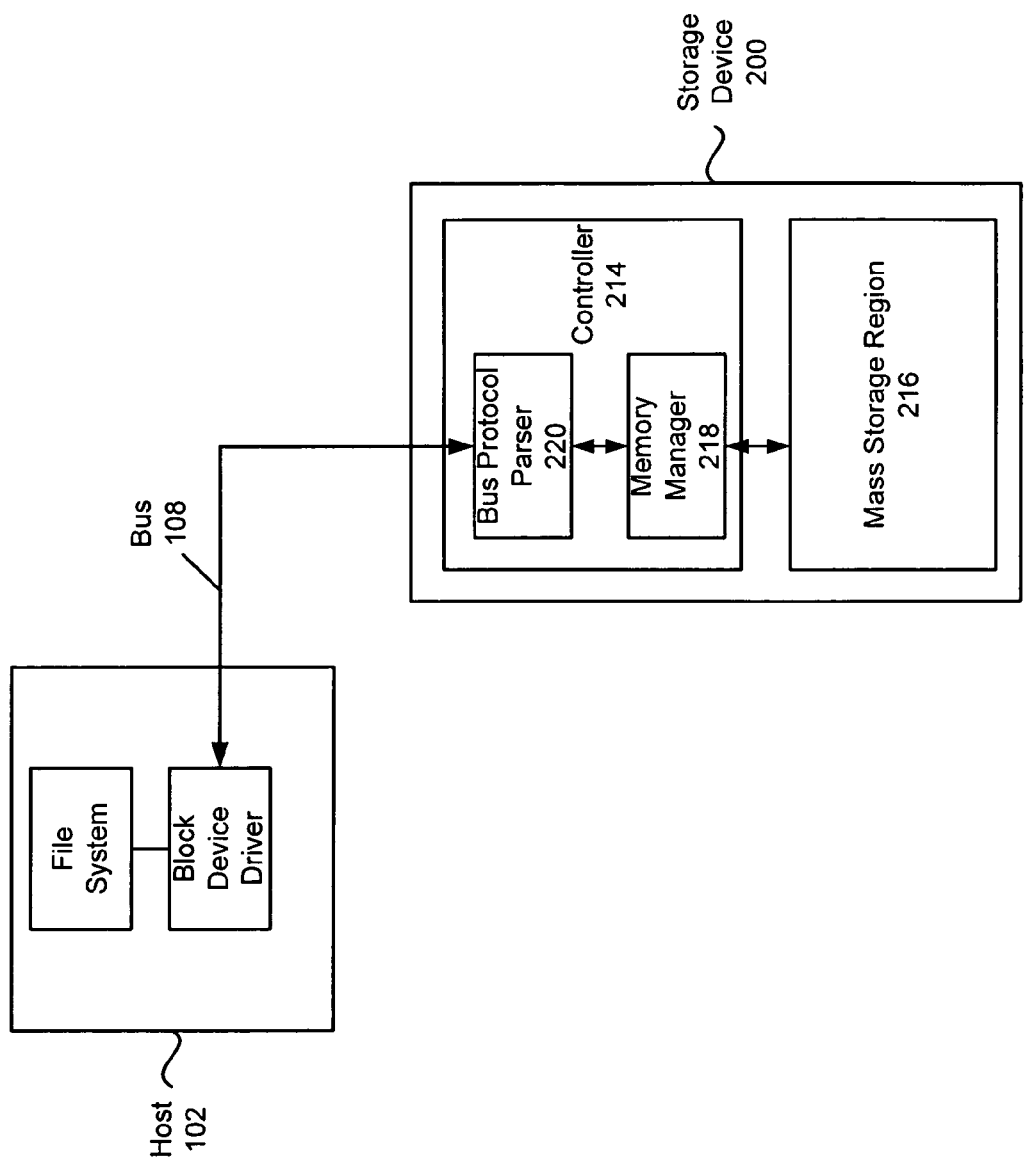
FIG. 2 illustrates s simplified block diagram of an example storage device in accordance with an embodiment of the present invention.

FIG. 2 is a block diagram that illustrates the general structure of a storage device 200 representative of each of the storage devices 104 and 106 in more detail in accordance with one embodiment of the present invention. In various embodiments, storage device 200 may be a conventional or legacy storage device. As previously mentioned, the storage device 200 may be either a removable or a non-removable device. In the illustrated embodiment, the storage device 200 is a conventional removable FLASH memory card and generally includes a memory controller 214 and a mass storage region 216. The memory controller 214 includes a memory manager 218 and protocol parser 220.

As will be understood by those familiar with the art, the protocol parser 220 is configured to analyze communications sent over the bus 108. More specifically, the protocol parser 220 is configured to analyze a communication sent from the host 102 and determine whether storage device 200 is an intended target of the bus communication based on a device identifier or address specified as part of the communication. If the bus communication is a memory operation directed towards storage device 200, the communication is passed to the memory manager 218 which in turn performs the requested operation accessing mass storage region 216. Other instructions directed at the storage device 200 are responded to by either the protocol parser 220 or the memory manager 218 as appropriate. Instructions and communications directed at other devices are generally simply ignored by storage device 200.

In embodiments where at least one of the storage devices in removable, the storage device identifier is preferably a permanent device identifier associated with the targeted storage device. As will be familiar to those skilled in the art, many types of storage devices such as FLASH memory cards have an associated permanent device identifier that may be used for this purpose. However, in embodiments that utilize storage devices that do not include permanent device identifiers, a device identifier assigned by the host 102 may be used. Here it should be noted that in some cases, a single physical device may include two or more addressable storage regions (or devices) within the physical device. In this case, each storage region may have a corresponding device identifier and/or set of logical addresses. Additionally, if a particular command is addressed to all storage devices on the bus 108, then either a broadcast identifier that indicates that the command was addressed to all devices on the bus, or a list of all of the targeted device identifiers may be used.

Generally, a communication such as a command transmitted from the host 102 includes an operation identifier that identifies the type of bus protocol operation to be performed. The identified operations may be memory operations such as read, write and erase operations; memory management commands such as an instruction for a targeted storage device to create a partition; initialization and authentication requests; interrupts; acknowledgements; error signals and any other bus related commands or operations.

Referring back to system 100, the host 102 controls various operations of the storage devices 104 and 106. By way of example, the host transmits commands to the storage devices instructing the storage device to write data, read data and erase along with other housekeeping operations. Commands are communicated from the host 102 over the bus 108 to one or more targeted storage devices connected with the bus. Only the storage device(s) targeted by a given command (e.g., by a device identifier and/or address within the command) accepts the command and executes an operation based on the command. It should be noted that, in the described embodiments, only the host 102 is capable of transmitting commands over the bus 108.

Figure 3:
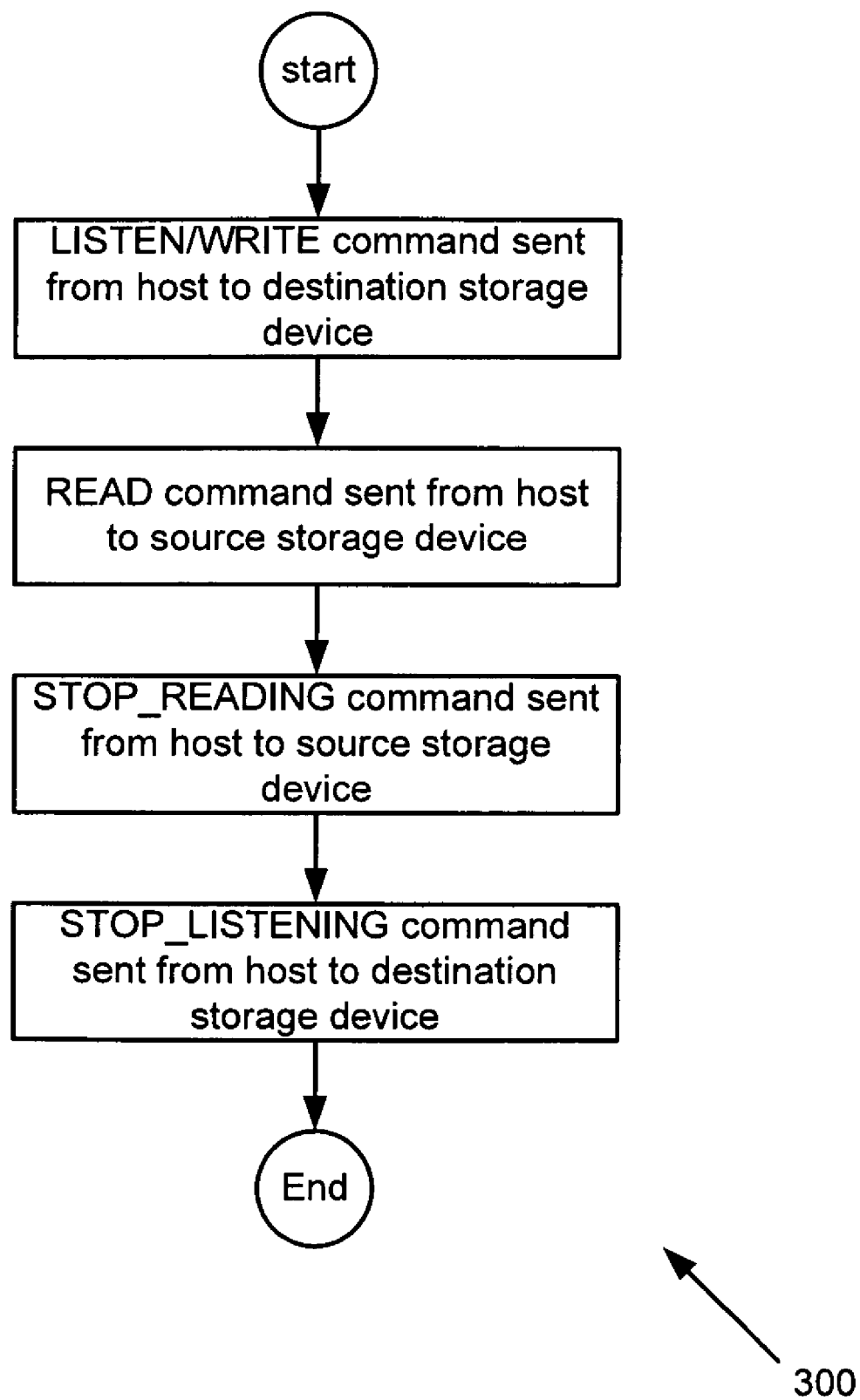
FIG. 3 shows a flowchart illustrating a process of transferring data directly between storage devices.

For the purpose of illustrating a basic example of a particular embodiment of the present invention, a process 300 of writing data from source storage device 104 to destination storage device 106 is described with reference to the flowchart of FIG. 3 and the system of FIG. 1. Process 300 begins at 302 with host 102 sending a LISTEN/WRITE command over bus 108 targeting storage device 106 and instructing storage device 106 to listen to the bus and write data from the bus into the device's memory. In one embodiment, the LISTEN/WRITE command instructs storage device 106 to begin listening to the bus 108 at a specific time T1 and write data from the bus after time T1 into the device's memory. More specifically, in embodiments in which a time division multiplexing protocol is used to organize the transfer of data over the bus 108, the host 102 may instruct the storage device 106 to begin listening to the bus 108 at a specific time slot X1. In yet another embodiment, the slave device 106 can be instructed to start listening immediately and wait until data is available on the bus 108 to write.

Host 102 also sends a READ command over bus 108 at 304 targeting storage device 104 and instructing storage device 104 to read data from the device's memory and to output the data onto bus 108. In one embodiment, the READ command instructs storage device 104 to begin reading and outputting data onto the bus 108 at a specific time, preferably at or after T1 so as to not lose any data. Again, in embodiments in which a time division multiplexing protocol is used to organize the transfer of data over the bus 108, the host 102 may instruct the storage device 104 to begin reading and outputting data onto the bus 108 at the specific time slot X1. In another embodiment, the slave device 104 is instructed to read and output data onto the bus immediately.

In this way, storage device 106 pulls the data directly output from storage device 104 from the bus 108 and writes the data into memory. More particularly, unlike in conventional arrangements, the data output from storage device 104 is not first temporarily cached in the host 102 or in any other device prior to being pulled from bus 108 and written into storage device 106. Thus, while the host 102 initiates the transaction of data between storage device 104 and storage device 106, the host 102 is not involved in storing and/or transmitting data.

Thus, while various master/slave bus protocols (such as the SD protocol) dictate that only the host may initiate transactions and send commands, the invention circumvents this conventional paradigm. That is, the invention enables the direct transfer of data between storage device 104 and 106 while enabling the use of legacy devices and master/slave protocols as each storage device presumes that the data it is sending or receiving over the bus 108 is being sent to or received from the host 102. It should also be appreciated that, in this way, the total quantity of data transmitted over the bus 108 may be approximately cut in half; that is, since data may be written directly from one storage device to another storage device, rather than first cached and then re-transmitted by the caching device, the amount of data transmitted over the bus 108 for a given transaction may be roughly cut in half and hence, the total bandwidth required may be similarly reduced. As a result, the data transfer rate between the storage devices themselves may be increased and, furthermore, the processor requirements of the host 102 may be reduced.

In one embodiment, storage device 104 continues reading and outputting data onto the bus 108 until such time as the host 102 issues a STOP_READING command at 306 targeting device 104 and instructing storage device 104 to stop reading and outputting data onto the bus 108. Similarly, storage device 106 continues pulling data from the bus 108 until such time as the host 102 issues a STOP_LISTENING command at 308 targeting device 106 and instructing storage device 106 to stop pulling data from the bus.

In an alternate embodiment, the READ command also instructs storage device 104 to continue outputting data onto the bus 108 until such point as a duration D1 has elapsed. Similarly, the LISTEN/WRITE command may also instruct storage device 106 to continue pulling data from the bus 108 until a duration D2 has elapsed. In a preferred embodiment, D2 is at least as long as D1 so as to not lose any data. By way of example, if the host 102 knows the amount of data to be transferred (e.g., the number of bits) and the operating frequency of the bus 108, then the host can calculate the duration of time needed to transfer the data and subsequently instruct storage device 104 to output data for this duration and instruct storage device 106 to continue listening and writing the data for this duration.

In another alternate embodiment, the LISTEN/WRITE command instructs storage device 106 to listen to the bus 108 during specific time slots Xn, which may or may not be consecutive. Data on the bus 108 during the time slots Xn are then written into the device's memory. In this alternate embodiment, the READ command similarly instructs storage device 104 to begin reading and outputting data onto the bus 108 during the specific time slots Xn. Again, it should be noted that the time slots may not be consecutive. More particularly, the host 102 may instruct the storage device 104 to output data A onto the bus 108 in time slots X1, X2, X3 and X4 which, again, may not in some embodiments be consecutive. The host 102 would then instruct storage device 106 to listen and pull data from the bus 108 during time slots X1, X2, X3 and X4.

The foregoing description, for purposes of explanation, used specific examples to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

For instance, although process 300 was described with reference to transferring data from a single storage device 104 to another single storage device 106, it should be appreciated that the host 102 may issue a multicast or broadcast command instructing a plurality of storage devices to listen to the bus at specific times and write the associated data to memory. In this way, multiple copies of the data can be stored on a plurality of devices simultaneously.

Additionally, although the foregoing description has been described in the context of reading data from one memory device and transferring data to another memory device where it is to be stored, it should also be appreciated that aspects of the present invention are applicable to devices other than those especially configured as storage devices. By way of example, aspects of the present invention may be useful in transferring communications and data to and from external networks. More specifically, a first slave device coupled with a bus may be a network card acting as a network bridge to an external network or protocol, such as WiMax, Wi-Fi or Bluetooth, and the second slave device may be a storage device coupled with the bus. By way of example, a master device may instruct the first slave device to directly pass data it receives or has received from an external network through the bus to the second slave device, or instruct the second slave device to send data to the first slave device to be communicated over the external network. In such embodiments, the network card may be a card on the SD bus, using SDIO protocol.

Furthermore, although foregoing description has been described in terms of a particular bus/device configuration, in alternate embodiments the storage devices may be connected in other suitable configurations or arrangements. By way of example, in the embodiment illustrated in FIG. 4, each device, including slave storage devices 404, 406 and 408, is connected serially in a daisy chain arrangement. Such an arrangement may be desirable in various high speed consumer electronics applications, among others. Although only three storage devices are shown in the embodiment illustrated in FIG. 4, it will be appreciated that more or fewer devices may be arranged in the daisy chain arrangement. In general, two to five devices are typically connected in such an arrangement.

By daisy chain arrangement, it is meant that pins of one device are electrically connected to pins of a neighboring device. The connection can be either by hard soldering, by a printed circuit layout or by connection of socket pins. For example, a second set of pins from storage device 404 can be connected to a first set of pins from storage device 406 via a set of communication lines 432, a second set of pins of storage device 406 can be connected to a first set of pins of storage device 408 via a set of communication lines 434, and so on. In this way, all of the storage devices other than the first and last device in the daisy chain arrangement are connected to two immediately adjacent neighboring devices. Unlike the other storage devices, however, the first set of pins of storage device 404 are connected via a set of communication lines 430 with host 402 serving as the master device. In one embodiment, all of the storage devices share a clock; however, this is not a requirement as each device may generate its own clock.

In the illustrated embodiment, there is no common bus that interconnects the storage devices 404, 406 and 408 with one another and to the host 402. Rather, in this configuration, each device passes to the next device downstream in the chain the commands from the host 402 that are not addressed to itself. That is, each storage device (e.g., storage devices 406 and 408) other than the first device in the chain (e.g., storing device 404) is coupled to the host 402 by means of any upstream devices in the chain. That is, communications or information passed from the host 402 to a particular storage device must first pass sequentially through all other upstream devices in the chain. In effect, the storage devices 404, 406 and 408 along with communication lines 430, 432 and 434 form a virtual communication bus that serves to pass communications and information from the host to the storage devices and from the storage devices to the host.

A more detailed description of such a daisy chain arrangement can be found in copending application Ser. No. 11/927,108 filed on Oct. 29, 2007 and entitled, "ADDRESSING MULTIPLE DEVICES ON A SHARED BUS," which claims priority from provisional application No. 60/979,372 filed on Oct. 11, 2007 and entitled "ADDRESSING AN ADDRESS-LESS DEVICE ON A SHARED BUS;" and copending application Ser. No. 11/928,110 filed Oct. 30, 2007 and entitled "SIGNALING AN INTERRUPT REQUEST THROUGH DAISY CHAINED DEVICES," which claims priority from provisional application No. 60/981,772 filed on Oct. 22, 2007 and entitled "SIGNALING AN INTERRUPT REQUEST THROUGH DAISY CHAINED DEVICES;" all of which are hereby incorporated by reference herein in their entirety for all purposes.

In one example embodiment in which the storage devices 404, 406 and 408 are arranged into a daisy chain configuration, a host 402 may transmit a LISTEN/WRITE command down the string of daisy-chained devices. By way of example, host 402 may transmit a LISTEN/WRITE command targeting storage device 406 over communication lines 430 where it is first received by storage device 404. Storage device 404 may then pass the LISTEN/WRITE command over communication lines 432 where the command is then received at target storage device 406. The LISTEN/WRITE command may instruct the storage device 406 to listen to communication lines 434 at a specific time and to write data from the communication lines 434 beginning at the specific time. Host 402 may also transmit a READ command targeting storage device 408 over communication lines 430. The READ command may be passed by storage devices 404 and 406 and along communication lines 432 and 434 before reaching target storage device 408 and may instruct storage device 408 to read data from memory and output the data onto communication lines 434 at a specific time. In this way, storage device 406 may listen to the communication lines 434 at the specific time instructed by the LISTEN/WRITE command and write the data it pulls from the communication lines 434, which has been directly read from storage device 408 and output onto communication lines 434 by storage device 408, without first having the data be transferred to the host 402.

Figure 4:
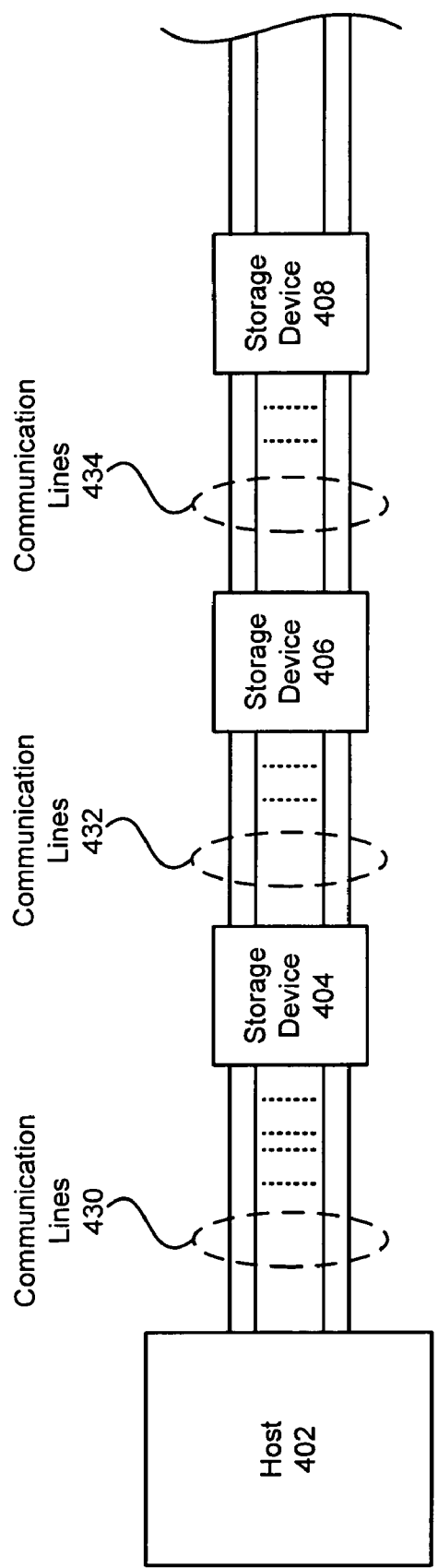
FIG. 4 illustrates a simplified block diagram of a system including a plurality of storage devices arranged into a daisy chain configuration in accordance with an embodiment of the present invention.

In other embodiments, the storage devices 404, 406 and 408 could be arranged into a daisy chain configuration as in FIG. 4 while a separate common bus interconnects the storage devices with themselves and to the host 402. In this way, unlike conventional arrangements, the signal or communication path between the daisy chained devices is separate and distinct from a bus and therefore, again unlike conventional approaches, does not consume bus resources that could otherwise be used to pass information and/or data between the storage devices and host 402.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of transferring data between a first and a second device coupled with each other and with a master device with one or more communication lines, comprising:
    instructing the first device, by the master device, to listen to the one or more communication lines until a duration D2 of time has elapsed; and
    instructing the second device to continue transmitting data onto the one or more communication lines until such point as at least a duration D1 of time has elapsed, wherein the data transmitted onto the one or more communication lines by the second device is received by the first device, without further intervention by the master device, wherein the master device determines the duration D1 based upon an amount of data to be transferred between the first and second devices and an operating frequency of the one or more communication lines, and wherein the duration D2 is at least as long as the duration D1.

2. A method as recited in claim 1, further comprising:
    dividing the duration D2 of time into a plurality of time slots, wherein any data on the one or more communication lines is received by and stored at the first device only during the plurality of time slots.

3. The method as recited in claim 2, further comprising:
    dividing the duration D1 of time into a plurality of time slots, wherein the second device transmits data onto the one or more communication lines only during the plurality of time slots.

4. A method as recited in claim 1, wherein the master device, first device and second device communicate according to the Secured Digital (SD) protocol.

5. A method of transferring data over a plurality of communication lines, comprising:
    sending a first command from a master device coupled with the communication lines to a first destination slave device coupled with the communication lines, the first command instructing the first destination slave device to listen to and write data from the communication lines starting at a first time; and sending a second command from the master device to a second source slave device coupled with the communication lines, the second command instructing the second source slave device to read and output first data onto the communication lines starting after the first time;

wherein the first data output from the second source slave device beginning after the first time is stored by the first destination slave device beginning after the first time without requiring first transferring the first data to the master device or any other storage device.

6. A method as recited in claim 5, wherein the master device is a host device and wherein the first and second slave devices are local storage devices.

7. A method as recited in claim 5, wherein at least one of the first and second slave devices is a removable device configured for ready removal from and addition to various communication lines.

8. A method as recited in claim 5, wherein the communication lines form a shared bus.

9. A method as recited in claim 5, wherein the first and second slave devices are two of a plurality of addressable devices arranged in a daisy chain configuration such that each of the addressable devices is connected with at least one neighboring device via one or more of the communication lines, wherein each device is connected with no more than two immediately adjacent neighboring devices, and wherein each device other than the last device in the chain passes communications, including commands, that are not targeted to itself to the next device in the chain via the communication lines that connect neighboring devices with one another.

10. A method as recited in claim 5 wherein the master device, first slave device and second slave device communicate according to the Secured Digital (SD) protocol.

11. A method as recited in claim 5, wherein the first slave device is unaware that the first data is coming directly from the second slave device and not from the master device.

12. A method as recited in claim 5, wherein the first command instructs the first device to listen to and write data from the communication lines for a first prescribed duration beginning after the first time.

13. A method as recited in claim 5, wherein the second command instructs the second slave device to output data onto the communication lines for a second prescribed duration beginning after the first time.

14. A method as recited in claim 5, further comprising sending a third command from the master device to the second slave device that instructs the second slave device to stop outputting data onto the communication lines at a second time.

15. A method as recited in claim 14, further comprising sending a fourth command from the master device to the first slave device that instructs the first slave device to stop listening to the communication lines at or after the second time.

16. A method as recited in claim 5, wherein the first command is multicast or broadcast to multiple slave devices including the first slave device substantially simultaneously and wherein the first command instructs at least a plurality of the multiple slave devices to listen to and write data from the communication lines starting at the first time such that the first data can be stored by the plurality of the multiple slave devices substantially simultaneously.

17. A method of communicating over a plurality of communication lines, comprising:

sending a first command from a master device coupled with the communication lines to a first slave device coupled with the communication lines, the first command instructing the first slave device to listen to the communication lines starting at a first time; and sending a second command from the master device to a second slave device coupled with the communication lines, the second command instructing the second slave device to output a third communication onto the communication lines starting after the first time;

wherein the third communication output from the second slave device is read by the first slave device beginning substantially at the second time without requiring first transferring the third communication to the master device or any other device.

18. A method as recited in claim 17, wherein the at least one of the first and second slave devices is a network device.

19. A method as recited in claim 18, wherein the network device serves a network bridge between the bus and a remote network.

20. A method as recited in claim 19, wherein the first slave device is a network card, the method further comprising outputting a fourth communication onto the remote network in response to the third communication.

21. A method as recited in claim 19, wherein the second slave device is a network card and wherein the third communication includes data received from the remote network by the second slave device.

22. A system, comprising:
a first addressable destination slave device configured to store data;
a second addressable source slave device configured to store data and including first data stored therein;
a master device arranged to manage the first and second slave devices; and
a plurality of communication lines that couple the master device and at least each of the first and second slave devices; and
wherein the master device is further arranged to send a first command to the first slave device instructing the first slave device to listen to and write data from the communication lines only until a duration D2 of time has elapsed beginning at a first time and a second command to the second slave device instructing the second slave device to read and output the first data onto the communication lines beginning at or after the first time only until a duration D1 of time has elapsed, such that the first data is transferred from the second source slave device to the first destination slave device without requiring first transferring the first data to the master device or any other storage device, wherein the master device determines the duration D1 based upon an amount of data to be transferred between the first and second devices and an operating frequency of the plurality of communication lines, and wherein the duration D2 is at least as long as the duration D1.

23. A system as recited in claim 22, further comprising:
dividing the duration D2 of time into a plurality of time slots, wherein any data on the plurality of communication lines is received by and stored at the first slave device only during the plurality of time slots.

24. A system as recited in claim 22, wherein at least one of the first and second slave devices is a removable device configured for ready removal from and addition to various communication lines.

25. A system as recited in claim 22, wherein the communication lines form a shared bus.

26. A system as recited in claim 22, wherein the first and second slave devices are two of a plurality of addressable devices arranged in a daisy chain configuration such that each of the addressable devices is connected with at least one neighboring device via one or more of the communication lines, wherein each device is connected with no more than two immediately adjacent neighboring devices, and wherein each device other than the last device in the chain passes communications, including commands, that are not targeted to itself to the next device in the chain via the communication lines that connect neighboring devices with one another.

27. A system as recited in claim 22, wherein the master device, first slave device and second slave device communicate according to the Secured Digital (SD) protocol.

28. A system as recited in claim 22, wherein the first slave device is unaware that the first data is coming directly from the second slave device and not from the master device.

29. A system as recited in claim 22, wherein the first command instructs the first device to listen to and write data from the communication lines for a first prescribed duration beginning at the first time.

30. A system as recited in claim 22, wherein the second command instructs the second slave device to read and output data onto the communication lines for a second prescribed duration beginning at or after the first time.

31. A system as recited in claim 22, wherein the master device is further arranged to send a third command to the second slave device that instructs the second slave device to stop outputting data onto the communication lines at a second time.

32. A system as recited in claim 31, wherein the master device is further arranged to send a fourth command to the first slave device that instructs the first slave device to stop listening to the communication lines at or after the second time.

33. A system as recited in claim 22, wherein the first command is multicast or broadcast to multiple slave devices including the first slave device substantially simultaneously and wherein the first command instructs at least a plurality of the multiple slave devices to listen to and write data from the communication lines starting at the first time such that the first data can be stored by the plurality of the multiple slave devices substantially simultaneously.

34. The method as recited in claim 22, further comprising:
dividing the duration D1 of time into a plurality of time slots, wherein the second slave device transmits data onto the plurality of communication lines only during the plurality of time slots.

* * * * *